Figure 1:
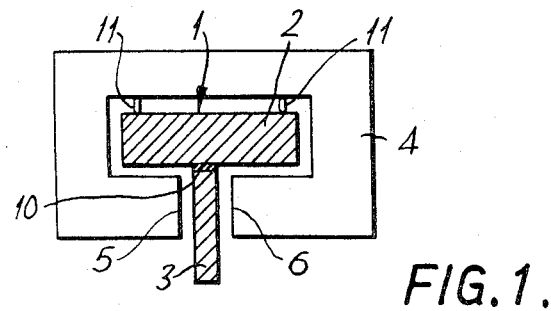

[11] 3,588,555

| [72] | Inventors | Eric Roberts Laithwaite |
| | | Ditton Hill, Surbiton, Surrey; |
| | | Hugh Robert Bolton, London, England |
| [21] | Appl No | 742,055 |
| [22] | Filed | July 2, 1968 |
| [45] | Patented | June 28, 1971 |
| [73] | Assignee | National Research Development Corporation |
| | | London, England |
| [32] | Priority | July 10, 1967 |
| [33] | | Great Britain |
| [31] | | 31694/67 |

[54] LINEAR ELECTRIC DRIVE WITH WINDINGLESS CARRIAGE MEANS AT LEAST PARTIALLY EMBRACING CONDUCTIVE RAIL MEANS
9 Claims, 5 Drawing Figs.

[52] U.S. Cl.............................................. 310/13, 104/148
[51] Int. Cl........................................... H02k 41/02
[50] Field of Search........................................ 310/12–15, 27; 318/121, 135, 116, 38; 104/148, 118, 106; 105/141, 49

[56] References Cited
UNITED STATES PATENTS

| 3,513,338 | 5/1970 | Polowjadoff | 310/13 |
| 448,598 | 3/1891 | Wheeler et al. | 310/13 |
| 3,196,303 | 7/1965 | Rowland et al. | 310/172 |
| 2,337,430 | 12/1943 | Trombetta | 310/13 |
| 1,985,254 | 12/1934 | Huse | 310/13 |
| 1,881,015 | 10/1932 | Ayers | 310/13X |
| 3,407,749 | 10/1968 | Frig | 310/13X |
| 1,910,639 | 5/1933 | Rose | 310/13 |

FOREIGN PATENTS

| 181,014 | 12/1906 | Germany | 310/12 |
| 1,542,774 | 10/1968 | France | 310/12 |
| 414,471 | 1946 | Italy | 310/12 |
| 361,098 | 12/1905 | France | 310/12 |

Primary Examiner—Milton O. Hirshfield
Assistant Examiner—B. A. Reynolds
Attorney—Cushman, Darby and Cushman ABSTRACT: A rail carriage is propelled by the reaction between a magnetic circuit carried by the carriage and which has a gap the magnetic circuit being energized from an AC current carrying conductor and a conductor rail lying in the gap. The reaction may be produced by a gap of varying dimensions, by shaded-poles or by a two-phase supply.

LINEAR ELECTRIC DRIVE WITH WINDINGLESS CARRIAGE MEANS AT LEAST PARTIALLY EMBRACING CONDUCTIVE RAIL MEANS

This invention relates to electric drive arrangements and has as its object to produce motion of a carriage along a track in which both the track and the carriage are of a simple construction.

According to the present invention an electric drive arrangement comprises an electrically conductive rail, a carriage movable along the rail and constructed with magnetic material positioned and shaped to partially embrace the rail whereby to provide a path for magnetic flux through the material and through a gap including the rail, an electrical current carrying conductor extending parallel to the rail and embraced by the said magnetic material whereby alternating currents in the conductor generate magnetic flux in the magnetic material, and means to produce a varying flux distribution in the section of the rail lying in the gap longitudinally thereof so that a reaction force is applied to the carriage to propel it along the rail.

Any convenient means may be employed for producing the varying flux distribution. For example, the end faces of the magnetic material on either side of the gap may be shaped so as to provide a gap of dimensions which vary longitudinally of the rail. Alternatively the end faces may be provided with shaded poles.

The current carrying conductor may be constituted by the rail itself, which can conveniently be T-shaped, the head part of the T being insulated from the leg part of the T. The leg part of the T may have a high resistivity.

Figure 2:
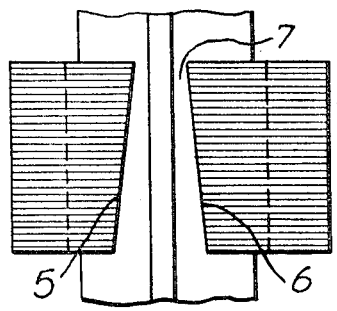
Figure 3:
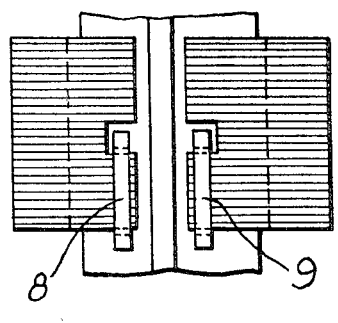
Figure 4A:
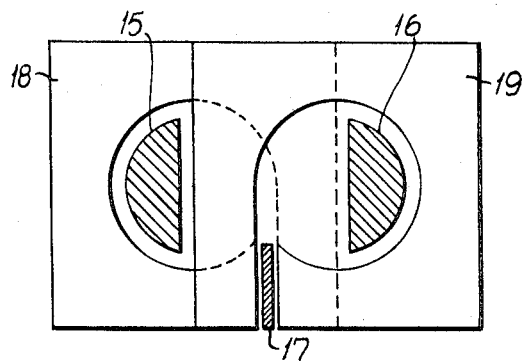
Figure 4B:
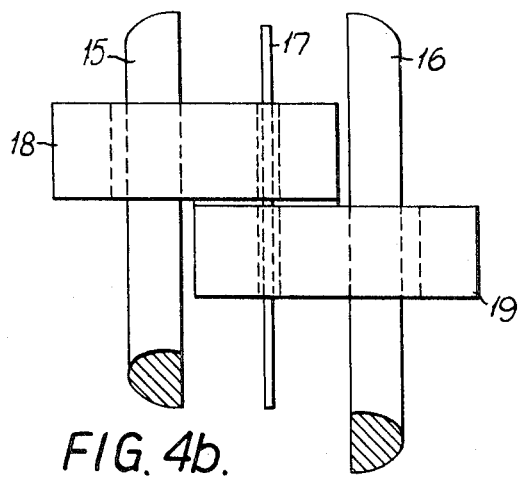

In order that the invention may be more fully understood reference will now be made to the accompanying drawing in which:

FIG. 1 illustrates an embodiment of the invention in a cross section through the rail, FIG. 2 and FIG. 3 are views in the direction of the arrow in FIG. 1 illustrating alternative means for varying the flux distribution, and FIG. 4a and 4b illustrate an alternative embodiment of the invention in elevation and plan respectively.

Referring now to FIG. 1 an electric drive arrangement comprises an electrical conductor rail 1 of T-shaped cross section the head part 2 of the T having a high conductivity and being constructed of, for example, aluminum, copper or brass or other suitable material and the leg part 3 of the T being of material of higher resistivity. The head and leg parts of the T may be insulated from each other by means of an insulating strip 10. The rail 1 is fixed and is laid to follow the desired path of movement of a carriage 4 designed to slide along rail 1 either with sliding contact or if desired with roller contact as by wheels 11. Carriage 4 is constructed of magnetic material and may be formed of a stack of laminations. The magnetic material embraces the head part 2 of the rail and terminates in end faces 5 and 6 facing the leg part 3 of the rail so that a gap is formed between end faces 5 and 6.

End faces 5 and 6 may be shaped as shown in FIG. 2 so that the gap 7 between them is of a steadily changing width in a direction longitudinally of the rail.

Alternatively the gap 7 may be constant as shown in FIG. 3 and shaded pole windings 8 and 9 may be provided each embracing part only of the end faces 5 and 6.

In operation rail 1 is energized from an AC supply. The alternating current is restricted to flow through the head part 2 of rail 1 due to the insulating strip 10. The alternating current generates an alternating magnetic flux in member 4 which passes across the gap 7 between end faces 5 and 6.

Due either to the shaping of the gap as illustrated in FIG. 2 or due to the shaded pole windings 8 and 9 as illustrated in FIG. 3, there will be a varying flux distribution in the gap which varies in a direction longitudinally of the rail. This causes a propelling force to be generated between the carriage and the rail to cause carriage 4 to be driven along the rail.

While it is not essential for the leg portion 3 of the rail to be formed of high resistivity material, in certain circumstances this results in a greater starting force being generated.

An alternative embodiment is illustrated in FIG. 4a and FIG. 4b. In this arrangement instead of a single rail, which may be composite, the functions of current-carrying conductor and reaction rail are provided by members spaced apart from each other. In the arrangement illustrated there are two current carrying conductors 15 and 16 and a reaction rail 17. The car has its magnetic material in two portions 18 and 19. Portion 18 embraces the conductor 15, but not conductor 16, while portion 19 embraces conductor 15 and not 16. Both portions 18 and 19 have gaps which are aligned with each other and the reaction rail 17 lies in the common gap.

When conductors 15 and 16 are energized from a two phase AC supply it will be seen that the flux in the gap varies longitudinally of rail 17 and hence a propelling force will be generated between the rail 17 and the carriage. The direction of motion of the force will depend on the relative phasing in the currents in conductors 15 and 16 and by reversing the phase of one of them, the carriage can be reversed in motion. This enables the drive to be used for servo operation and one example of this use is to control a pen on a chart recorder.

The above described two-phase arrangement can be extended for three or more phases by the addition of further conductors and additional portions of magnetic material secured to the carriage.

Alternatively, the arrangement illustrated in FIGS. 4a and 4b can be used for a single-phase supply in which only one of the two conductors 15 and 16 is energized at any one time and the propelling force is produced by a gap of varying dimension illustrated in FIG. 2 or by shaded poles as illustrated in FIG. 3 with the direction of the propelling force being opposite in the two portions of magnetic material. By switching the energization from one conductor to the other reverse motion and servo operation can be obtained.

We claim:
1. An electric drive arrangement comprising:
   an elongated electrically conductive rail,
   a carriage means of magnetic material shaped to define a gap between the ends thereof and shaped and positioned as to partially embrace said rail with a portion of said rail being within said gap, a magnetic flux path being defined by said carriage means, said gap and the width of said portion of said rail,
   electrical current-carrying conductor means extending parallel to said rail and embraced within said carriage means, said conductor means being positioned within said carriage means such that alternating current passing through said conductor means will generate a magnetic flux passing through said magnetic flux path and
   means for producing a varying flux distribution in said portion of said rail, longitudinally of said rail, thereby producing a propelling reaction force in said carriage means parallel to said rail.

2. The arrangement as claimed in claim 1 where the current carrying conductor is constituted by the rail itself.

3. The arrangement as claimed in claim 2 in which the rail is T-shaped having a leg-part within said gap and a head-part embraced within said carriage means.

4. The arrangement as claimed in claim 3 in which the head-part and the leg-part of the T are insulated from each other and the head-part constitutes the current carrying conductor.

5. The arrangement as claimed in claim 4 in which the leg-part of the T is of a higher electrical resistivity than said head-part.

6. The arrangement as claimed in claim 1 in which the means for producing a varying flux distribution longitudinally of the rail comprises said ends of said carriage means on either side of the gap shaped so that the gap varies in width longitudinally of the rail.

7. The arrangement as claimed in claim 1 in which the means for producing a varying flux distribution in the rail comprises shaded poles at the end faces of the magnetic material on either side of the gap.

8. The arrangement as claimed in claim 1 in which at least two electrical current-carrying conductors insulated from each other are provided each separately embraced by magnetic material forming part of the carriage 9. The arrangement as claimed in claim 8 in which each conductor is energized from a separate phase of a multiphase supply